(12) United States Patent
Nishida

(10) Patent No.: US 7,809,363 B2
(45) Date of Patent: Oct. 5, 2010

(54) MOBILE PHONE TERMINAL, PROGRAM MANAGEMENT METHOD, AND COMPUTER PROGRAM FOR THE SAME

(75) Inventor: Tetsu Nishida, Yokohama (JP)

(73) Assignee: Kyocera Corporation, Kyoto (JP)

( * ) Notice: Subject to any disclaimer, the term of this patent is extended or adjusted under 35 U.S.C. 154(b) by 1326 days.

(21) Appl. No.: 11/260,719

(22) Filed: Oct. 26, 2005

(65) Prior Publication Data
US 2006/0095916 A1 May 4, 2006

(30) Foreign Application Priority Data
Oct. 29, 2004 (JP) ............................ 2004-315697

(51) Int. Cl.
H04W 24/00 (2009.01)
H04M 3/00 (2006.01)
H04M 1/00 (2006.01)

(52) U.S. Cl. ..................... 455/418; 455/423; 455/425; 455/550.1; 455/556.2

(58) Field of Classification Search .................. 455/68, 455/418–420, 550.1, 556.2, 558, 453, 514, 455/552.1; 718/100, 107–108, 103–104, 718/105; 719/321–322, 327–328; 717/168–170, 717/173–178, 120, 127, 131, 160–161, 154; 715/749, 810, 780, 783; 710/21–24; 712/216, 712/219, 233–234, 241, 244
See application file for complete search history.

(56) References Cited

U.S. PATENT DOCUMENTS 6,934,532 B2 * 8/2005 Coppinger et al. ........ 455/412.1
6,961,587 B1 * 11/2005 Vilppula et al. ............. 455/558

(Continued)

FOREIGN PATENT DOCUMENTS

JP 06-044084 2/1994

(Continued)

OTHER PUBLICATIONS

Japanese language notice of allowance date Jun. 22, 2010 and its English language translation for corresponding Japanese application 2004315697 lists the reference above.

(Continued)

*Primary Examiner*—Meless N Zewdu
(74) *Attorney, Agent, or Firm*—Hogan Lovells US LLP

(57) ABSTRACT

In order to provide a mobile phone terminal which is capable, when changing over between an application program which is implemented as standard and a downloaded program which is not implemented as standard which have been started together, of restarting programs in an order which the user anticipate. An execution unit performs any of the procedures of execution, temporary suspension, and termination of programs by storing, in an execution state storage unit, information for programs which consist of static applets and downloaded applets. A management unit, when the activation of a static applet is requested in a situation that a downloaded applet is stored in the execution state storage unit as a program which is being executed, along with storing the downloaded applet in the execution state storage unit as being in a temporarily suspended state, and generating a dummy applet, also stores the dummy applet in the execution state storage unit as being in a temporarily suspended state, and next starts the static applet with the program execution unit.

18 Claims, 10 Drawing Sheets

U.S. PATENT DOCUMENTS

| | | | |
|---|---|---|---|
| 7,325,083 B2 * | 1/2008 | Watt et al. | 710/261 |
| 7,539,853 B2 * | 5/2009 | Orion et al. | 712/244 |
| 7,571,436 B2 * | 8/2009 | Yoshida et al. | 717/163 |
| 7,600,231 B2 * | 10/2009 | Furuichi et al. | 719/321 |
| 2003/0046448 A1 * | 3/2003 | Fischer et al. | 709/328 |
| 2004/0023646 A1 * | 2/2004 | Inami et al. | 455/418 |

FOREIGN PATENT DOCUMENTS

| | | |
|---|---|---|
| JP | 06-119188 | 4/1994 |
| JP | 2002175191 A | 6/2002 |
| JP | 2003-177926 | 6/2003 |
| JP | 2003271397 A | 9/2003 |
| JP | 2003-319020 | 11/2003 |
| JP | 2004304725 A | 10/2004 |

OTHER PUBLICATIONS

Japanese language office action and its English language translation for corresponding Japanese application 2004315697 lists the references above.

* cited by examiner

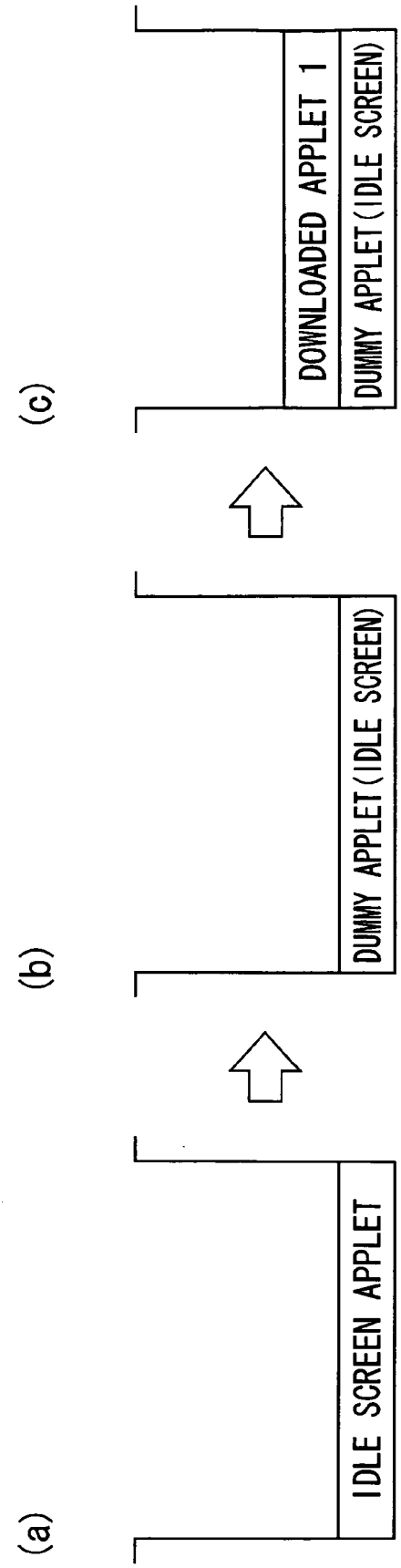

MOBILE PHONE TERMINAL, PROGRAM MANAGEMENT METHOD, AND COMPUTER PROGRAM FOR THE SAME

BACKGROUND OF THE INVENTION

1. Field of the Invention

The present invention relates to a mobile phone terminal which controls the execution of multiple programs, to a program management method and to a computer program which performs it.

Priority is claimed on Japanese Patent Application No. 2004-315697, filed Oct. 29, 2004, the content of which is incorporated herein by reference.

2. Description of Related Art

With prior art technique, in a single task operating system, in order to perform multi task like operation in which multiple programs are processed at the same time, thread history for application programs which are operating is stored in the memory of an OS (Operating System). Whether or not there is an application program which is requesting operation for the next is monitored by the operating system with a timer or the like. If there is an application program which is requesting operation for the next, that application program is added to the application program thread history, and the operating system shifts its operation to that application program. When shifting in order again to operate the application program which was executing before, a system has been practiced in which the processes are shifted one at a time by reading in order from those which have been stored first in the stored thread history (for example refer to Japanese Unexamined Patent Application, First Publication No. H06-44084).

The technique described in Japanese Unexamined Patent Application, First Publication No. H06-44084 is an example of operation upon a personal computer, upon which more processing capability is available than a mobile phone terminal, and moreover in which the ratio of occasion of unexpected interruptions of operation, for example due to incoming calls, is low.

With a prior art technique for a mobile phone terminal, even though activation requests for multiple application programs are issued by the timer or the like, it has not been possible to start processing the next application program without finishing the processes one at a time. Furthermore, it has also not been possible to maintain multiple states of application programs which were executed before in storage. Due to this, with the mobile phone shown in the prior art technique of references #2 (Japanese Unexamined Patent Application, First Publication No. 2003-319020), operation has been performed by individual monitoring when an event such as incoming calls or the like occurs, referring to the type or the state of the application program.

With a mobile phone terminal, for application programs which are implemented by the maker of the mobile phone, operation is performed so as to operate in a multi-tasking manner with a small memory capacity, by implementing a different technique from those disclosed in Patent References #1 and #2, in order to comply with a small memory capacity.

Now, with recent mobile phone terminals, apart from the application programs which are implemented as a standard (or originally installed) by the mobile phone terminal maker, there are programs such as games and the like which the user downloads and uses by operating the mobile phone terminal via a network (hereinafter termed "downloaded programs"). Such downloaded programs are almost always built according to a common specification, in order to act on any mobile phone terminal operating system from any maker.

However, these downloaded programs are not designed based upon the assumption that they process according to the multi-tasking operation which is implemented by the individual mobile phone maker. Due to this, if a downloaded program and a program which is implemented as a standard are activated together upon the operating system, when shifting between these programs, there is the problem that the program which is implemented as a standard undesirably performs restart operation which is not anticipated by the user.

SUMMARY OF THE INVENTION

The present invention has been conceived in order to solve the above described problem, and it takes as its objective to provide a mobile phone terminal, a program management method, and a computer program, which are capable, when shifting programs, of restarting programs according to the order which the user anticipates, even in a situation in which an application program according to a standard implementation and a downloaded program which is not implemented in a standard manner have been activated together.

According to the present invention as specified below, it becomes possible to provide a mobile phone terminal, a program management method, and a computer program, which, when shifting programs, are capable of restarting programs according to the order which the user anticipates, even in a situation in which an application program according to a standard implementation and a downloaded program which is not implemented in a standard manner have been activated together.

A first aspect of the present invention is a mobile phone terminal capable of executing a managed program and an unmanaged program, comprising: a program execution unit which performs any of procedures of activation, suspension, and termination of the managed program and the unmanaged program which are stored in an execution state storage unit; and a program management unit which, when execution of the managed program is requested while the unmanaged program is stored in the execution state storage unit as a program which is being activated, along with storing the unmanaged program in the program execution unit as being in a suspended state in the execution state storage unit, generating a substitutional program which is a dummy program and corresponds to the unmanaged program, and storing the substitutional program in the execution state storage unit as being in a suspended state, after that, activates the managed program in the program execution unit.

A second aspect of the present invention is a mobile phone terminal according to the first aspect, further comprising: a restart information storage unit which, in a situation in which activation of another program is requested while the managed program in the execution state storage unit is being activated, when the managed program is terminated and the another program is activated, along with terminating the managed program, stores restart information for subsequently restarting the managed program, and wherein the program management unit, when putting into activated state the substitutional program which has been in suspended state, refers to the restart information storage unit and, if restart information is stored, restarts the managed program in the program execution unit corresponding to the restart information.

A third aspect of the present invention is a mobile phone terminal according to the second aspect, wherein the program management unit, when it has referred to the restart information storage unit due to activation of the substitutional program which has been in suspended state, if corresponding restart information is not stored, then terminates the substitutional program in the program execution unit.

A fourth aspect of the present invention is a mobile phone terminal according to the first aspect, wherein the managed program is a program which is originally installed and managed by the program management unit, and the unmanaged program is a program which is additionally installed by an operation of a user.

A fifth aspect of the present invention is a mobile phone terminal according to the first aspect, wherein the program management unit, if the substitutional program is forcibly terminated by the program execution unit, requests the program execution unit to delete the provisional program which is stored in the execution state storage unit.

A sixth aspect of the present invention is a mobile phone terminal according to the second aspect, wherein the mobile phone terminal is further capable of activating an idle screen program which displays an idle screen in a state in which communication is being awaited, and the program management unit, when activating another program in a state in which the idle screen program is stored in the execution state storage unit as a program which is being activated, along with storing in the restart information storage unit restart information for restarting the idle screen program which is being activated, also starts the another program in the program execution unit after terminating the idle screen program.

A seventh aspect of the present invention is a program management method which is applied to a mobile phone terminal which includes: an execution state storage unit; and a program execution unit which performs any of procedures of execution, suspension, and termination of programs by storing a managed program and an unmanaged program in the execution state storage unit; the program management method comprising: a step of, when activation of a managed program is requested in a state in which an unmanaged program is stored in the execution state storage unit as a program which is being activated, along with storing the program which is in the program execution unit as being in a suspended state in the execution state storage unit, also generating a substitutional program; a step of storing the substitutional program in the execution state storage unit as being in a suspended state; and a step of, after having put the substitutional program into suspended state, starting the managed program in the program execution unit.

An eighth aspect of the present invention is a program management method according to the seventh aspect, further including: a step of, in a situation in which activation of another program is requested while the managed program in the execution state storage unit is being activated, when the managed program is terminated and the another program is activated, along with terminating the managed program, storing restart information for subsequently restarting the managed program; a step of, when putting into activated state the substitutional program which has been in suspended state, judging whether or not the restart information is stored, and restarting the managed program in the program execution unit corresponding to the restart information if the restart information is stored.

A ninth aspect of the present invention is a program management method according to the eighth aspect, further including: a step of, when the substitutional program which has been in suspended state is activated, judging whether or not restart information is stored, terminating the substitutional program in the program execution unit if corresponding restart information is not stored.

A tenth aspect of the present invention is a program management method according to the seventh aspect, wherein the managed program is a program which is originally installed and managed, and the unmanaged program is a program which is additionally installed by an operation of a user.

An eleventh aspect of the present invention is a program management method according to the seventh aspect, further including: a step of, if the substitutional program is forcibly terminated by the program execution unit, requesting the program execution unit to delete the provisional program which is stored in the execution state storage unit.

A twelfth aspect of the present invention is a program management method according to the seventh aspect, wherein the mobile phone terminal is further capable of activating an idle screen program which displays an idle screen in a state in which communication is being awaited, further including: a step of, when activating another program in a state in which the idle screen program is stored in the execution state storage unit as a program which is being activated, along with storing restart information for restarting the idle screen program which is being activated, also starting the another program in the program execution unit after terminating the idle screen program.

A thirteenth aspect of the present invention is a computer program product in a computer readable medium of a computer included in a mobile phone terminal which has: an execution state storage unit; and a program execution unit which performs any of procedures of execution, suspension, and termination of programs by storing a managed program and an unmanaged program in the execution state storage unit, the computer program including: first instructions for, when the execution of the managed program is requested in a situation in which the unmanaged program is stored in the execution state storage unit as a program which is being activated, along with making the program execution unit to store the program as being in a suspended state in the execution state storage unit, generating a substitutional program; second instructions for storing the substitutional program in the execution state storage unit as being in a suspended state; and third instructions for, after having put the substitutional program into a suspended state, starting the managed program in the program execution unit.

A fourteenth aspect of the present invention is a computer program product according to the thirteenth aspect, further including: fourth instructions for, in a situation in which activation of another program is requested while the managed program in the execution state storage unit is being activated, when the managed program is terminated and the another program is activated, along with terminating the managed program, storing restart information for subsequently restarting the managed program; fifth instructions for, when putting into activated state the substitutional program which has been in suspended state, judging whether or not the restart information is stored, and restarting the managed program in the program execution unit corresponding to the restart information if the restart information is stored.

A fifteenth aspect of the present invention is a computer program product according to the fourteenth aspect, further including: seventh instructions for, when the substitutional program which has been in suspended state is activated, judging whether or not restart information is stored, terminating the substitutional program in the program execution unit if corresponding restart information is not stored.

A sixteenth aspect of the present invention is a computer program product according to the thirteenth aspect, wherein the managed program is a program which is originally installed and managed, and the unmanaged program is a program which is additionally installed by an operation of a user.

A seventeenth aspect of the present invention is a computer program product according to the thirteenth aspect, further including: eighth instructions for, if the substitutional program is forcibly terminated by the program execution unit, requesting the program execution unit to delete the provisional program which is stored in the execution state storage unit.

An eighteenth aspect of the present invention is a computer program product according to the thirteenth aspect, wherein the mobile phone terminal is further capable of activating an idle screen program which displays an idle screen in a state in which communication is being awaited, further including: ninth instructions for, when activating another program in a state in which the idle screen program is stored in the execution state storage unit as a program which is being activated, along with storing restart information for restarting the idle screen program which is being activated, also starting the another program in the program execution unit after terminating the idle screen program.

BRIEF DESCRIPTION OF THE DRAWINGS

FIG. 13 is a figure showing changes of the execution state storage unit when an idle screen applet is temporarily terminated, in this embodiment.

DETAILED DESCRIPTION OF THE INVENTION

In the following, a mobile phone terminal according to an embodiment of the present invention will be explained with reference to the drawings.

Figure 1:
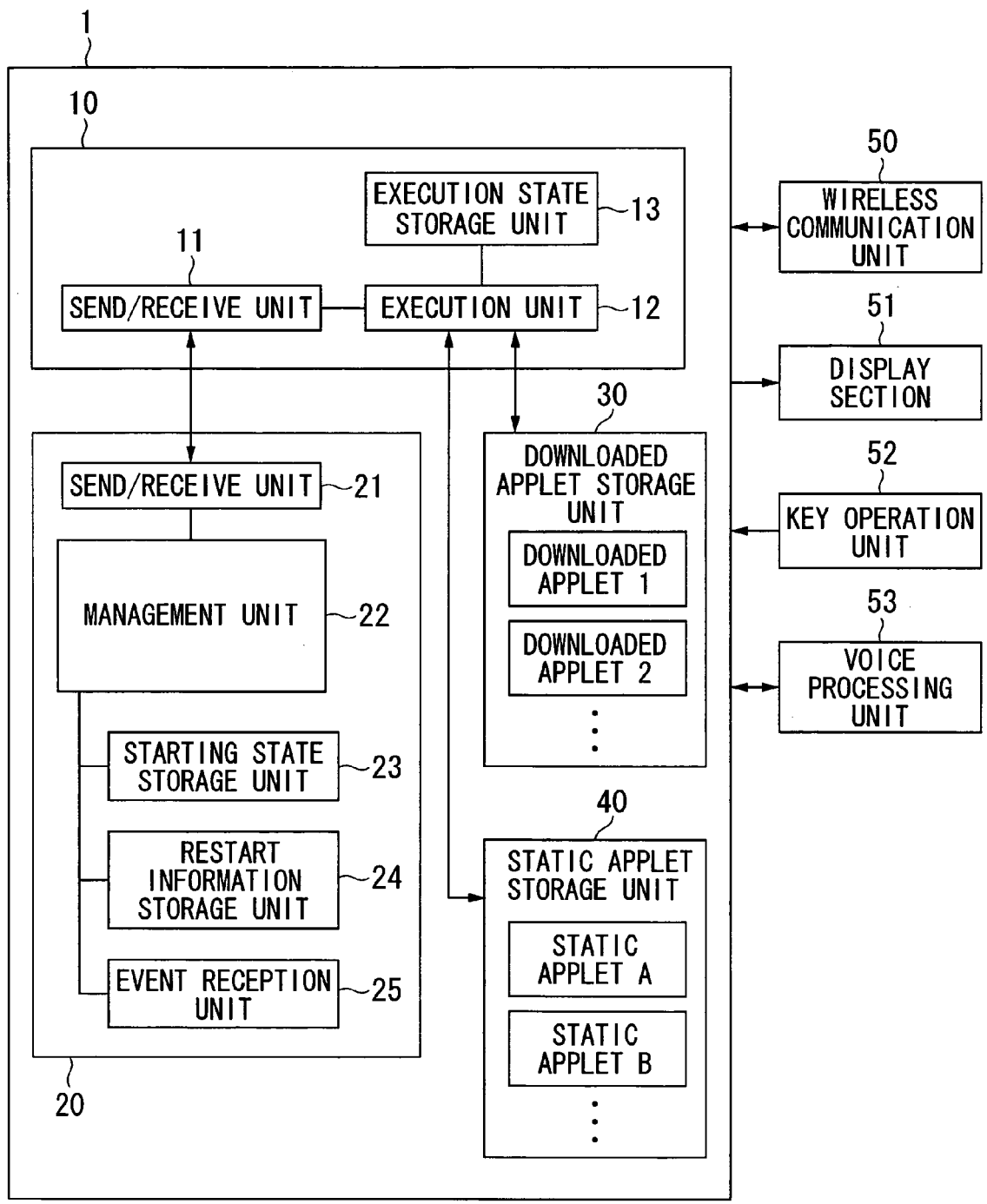
FIG. 1 is a block diagram showing the internal structure of a mobile phone terminal according to an embodiment of the present invention.

FIG. 1 is a schematic block diagram showing a mobile phone terminal 1 according to this embodiment.

The mobile phone terminal 1 of FIG. 1 includes a wireless communication unit 50 which connects to a public communication network by radio communication, a display section 52 which includes a liquid crystal screen, a key operation unit 52 which receives input from the user, and a voice processing unit 53 which inputs and outputs voice, and provides fundamental functions as a portable telephone.

Furthermore, this mobile phone terminal 1 includes: an operating system 10 (hereinafter termed an "OS") which executes applets corresponding to the above described programs; an application manager 20 (hereinafter termed an APMAN: Application Program Manager) which performs activation control of these applets by deciding upon the status of conflicts among them and the like; a static applet storage unit 40 which stores static applets which are software such as mailer software for control of electronic mail, browsing software for browsing web pages on the internet, address book management software for initiating telephone calls, and the like, which are provided in a standard manner, and the activation of them are controlled by the APMAN 20; and a downloaded applet storage unit 30 which stores downloaded applets such as game programs or the like, which can be downloaded from the internet or the like via the public communication network using the wireless communication unit 50 by the user's operation of the key operation unit 52, or can be read in from a removable recording medium by predetermined operations.

In the OS 10, a send/receive unit 11 sends and receives information such as requests to and from the APMAN 20 for activation of applets and so on, and responses from applets which have been activated and so on. An execution unit 12 reads static applets from the static applet storage unit 40 or downloaded applets from the downloaded applet storage unit 30, based upon requests from the APMAN 20, and stores the data of these downloaded applets in an execution state storage unit 13 and executes it. In case of some applets which are executed, for example, showing a pane upon the screen of the display section 51, or outputting from the voice processing unit 53 are processed. The execution state storage unit 13 stores the data of the applet which is being executed by the execution unit 12 and the data of applets which are temporarily suspended.

In the APMAN 20, a send/receive unit 21 sends and receives information to and from the send/receive unit of the OS 10 such as commands for activation of applets and so on, and responses from applets which have been activated and so on.

When activating a static applet, the management unit 22 decides upon the status of conflicts of the static applet and so on, and, if it is possible to activate the static applet, transmits a activation request for the static applet via the send/receive unit 21 to the execution unit 12 of the OS 10. Furthermore, when activating a downloaded applet, the management unit 22 transmits a activation request for the downloaded applet to the execution unit 12 of the OS 10.

An activation state storage unit 23 stores information related to applets which are being activated by the execution unit 12 of the OS 10 or are temporarily suspended. In order to perform multi-tasking type operation for static applets, restart information storage unit 24 stores information for restarting static applets which are suspended by the APMAN 20, although they are terminated by the management unit 22 in the OS 10. Herein, the state in which being terminated by the OS 10, however, being suspended by the APMAN 20, will be termed the temporarily terminated state. An event reception unit 25 receives events based upon commands for activating or stopping applets due to operation by the user, and events based upon commands from applets for activating other applets, and the like.

It should be understood that, the program execution unit corresponds to the execution unit 12, and the program management unit corresponds to the management unit 22.

Figure 2:
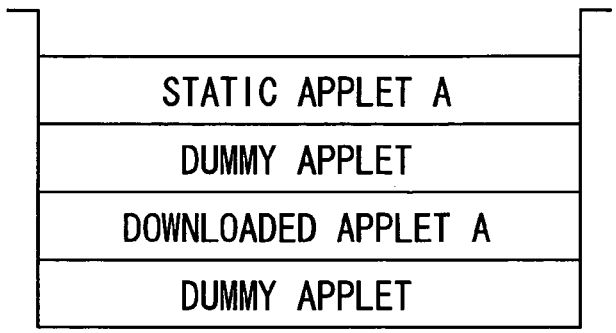
FIG. 2 is a data structure diagram for an execution state storage unit of this embodiment.

FIG. 2 is a figure showing the data structure of the execution state storage unit 13. This execution state storage unit 13 is a stack type storage region which is allocated in a heap region when an applet is executing, and in which the data of that applet is stored. As shown in FIG. 2, since this execution state storage unit 13 is a stack type storage region, the applet which was activated first is stored at the bottommost level of the stack, and, when a new applet is activated, the applet which was previously activated is temporarily suspended, and the new applet is piled upon the applet which has been temporarily suspended. That is to say, the applet data which is stored in the uppermost layer corresponds to the applet which is currently being activated. Furthermore, when a termination is processed by the execution unit 12, the applet data at the uppermost layer is deleted, and the suspension of the applet which corresponds to the applet data that is stored one level down is cancelled, and the applet corresponding to that applet data is restarted.

Figure 3:
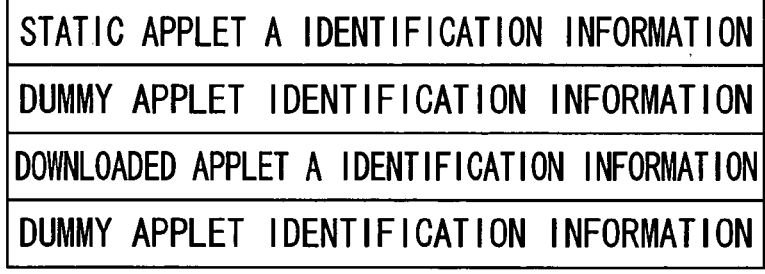
FIG. 3 is a data structure diagram for a starting state storage unit of this embodiment.

FIG. 3 is a figure showing the data structure of the starting state storage unit 23. This starting state storage unit 23 is also a storage region of the stack type, and in it there is stored information related to the applets which are being executed by the execution unit 12, such as, for example, the identification information appended to each of the applets and so on. That is to say, the identification information for the applets which correspond to the applet data stored in the execution state storage unit 13 is stored according to the order in which they are stored in the execution state storage unit 13. By referring to the starting state storage unit 23, the management unit 22 of the APMAN 20 is able to acquire the information for an applet which is being activated by the execution state storage unit 13 of the OS 10, or which is temporarily suspended.

Figure 4:
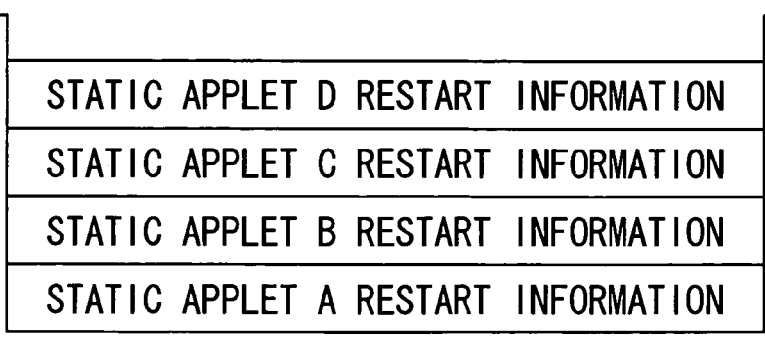
FIG. 4 is a data structure diagram for a restart information storage unit of this embodiment.

FIG. 4 is a figure showing the data structure of the restart information storage unit 24. This restart information storage unit 24 is also a storage region of the stack type. In order to be able to activate multiple static applets at the same time, while reducing the memory amount of the execution storage unit 13, the APMAN 20 performs activation control in order that there is always one static applet which is being activated by the OS 10. At this time, restart information for restarting a static applet, which is an applet that has been terminated by the OS 10, and which is in the above described temporarily terminated state in which it is being suspended by the APMAN 20, is stored in the restart information storage unit 24.

Next, the activation control for applets by the APMAN 20, when only handling static applets, will be explained with reference to FIGS. 5 and 6.

Figure 5:
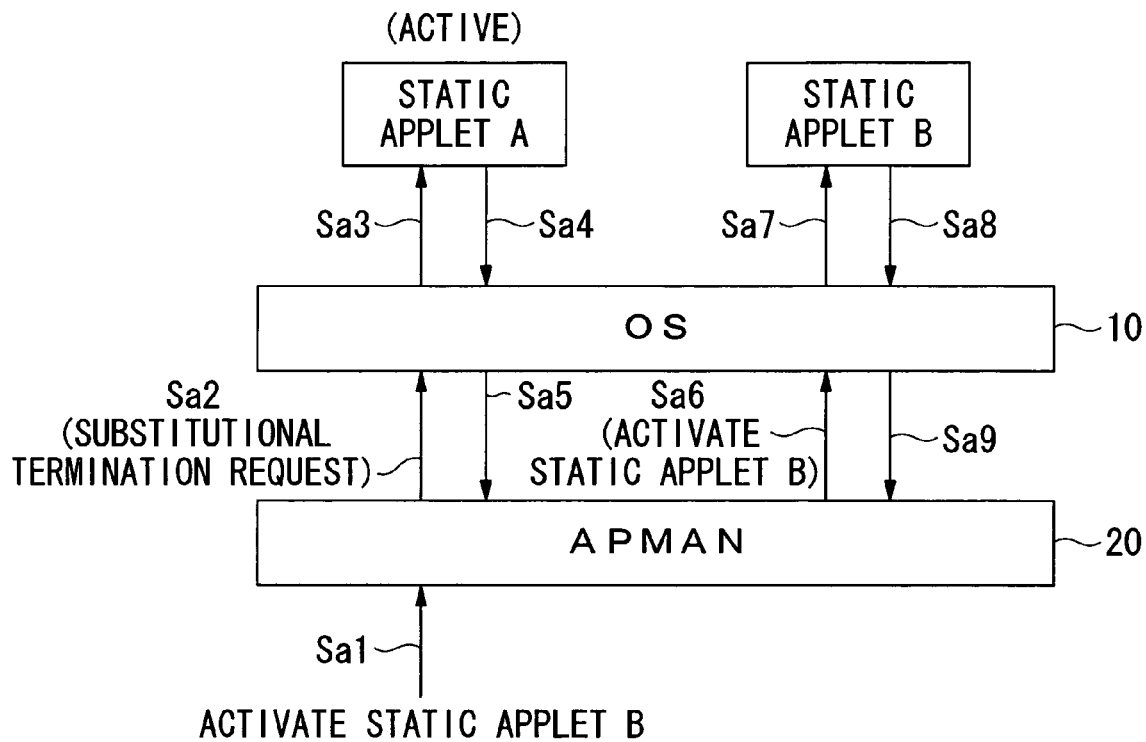
FIG. 5 is a first figure for explanation of the operation of a prior art APMAN.

FIG. 5 is a figure showing the procedure, when activating another static applet during the execution of a static applet A, for temporarily terminating the static applet A which is being activated. Referring to FIG. 5, while the static applet A is being activated (id est, is in the active state), the event reception unit 25 receives an activation event for a static applet B, and, upon receipt of this activation event, the event reception unit 25 transmits (in step Sa1) the information which indicates that the activation event has been received to the management unit 22. The management unit 22 reads information from the starting state storage unit 23 for the applet A that is being activated. Since the applet that is being executed and has been read is a static applet that is being managed by the APMAN 20, accordingly the management unit 22 decides upon the conflict state between the static applet A which is being executed and the static applet B for which the activation request has been made, and, if they do not conflict, a temporal termination request is transmitted to the execution unit 12 of the OS 10 (in step Sa2), in order to put the static applet A into the temporarily terminated state.

Upon receipt of this temporal termination request, the execution unit 12 transmits (in step Sa3) a termination command including temporal termination request information to the static applet A, in order, along with terminating the static applet A by the OS 10, to put it into the suspension state by the APMAN 20. The static applet A receives this termination command including the temporal termination request information, and transmits a termination response including restart information for restart to the execution unit 12, and (in step Sa4) deleting from the execution state storage unit 13 is processed by the execution unit 12. Upon receipt of the termination response, the execution unit 12 transmits restart information for the static applet A to the management unit 22. Upon receipt of this restart information, the static applet A stores this restart information in the restart information storage unit 24. Furthermore, it deletes the information for the static applet A from the starting state storage unit 23.

Next, upon receipt of the restart information for the static applet A, in order to start the static applet B, the management unit 22 transmits (in step Sa6) an activation request for the static applet B to the execution unit 12. Upon receipt of the activation request for the static applet B, the execution unit 12 reads the static applet B from the static applet storage unit 40, and stores the static applet B in the execution state storage unit 13 (in step Sa7). After being activated, the static applet B transmits (in step Sa8) an activation response to the execution unit 12. The execution unit 12 transmits activation information for the static applet B to the management unit 22. Upon receipt of the activation information for the static applet B, the management unit 22 stores (in step Sa9) the information for the static applet B in the starting state storage unit 23.

That is to say, according to the procedure shown in FIG. 5, since, when a static applet is being activated, even if another static applet is started, that static applet which is being activated is temporarily terminated, accordingly it is possible to ensure that the data of the static applet which is stored in the execution state storage unit 13 that is being activated, id est, the applet that is being executed by the OS 10 can be only one. When the other static applet has been terminated, the static applet is restarted based upon the restart information which is stored in the restart information storage unit 24, therefore, it becomes possible to perform multi-tasking type operational control in which execution of the static applet is continued from the state in which the applet has been suspended.

Figure 6:
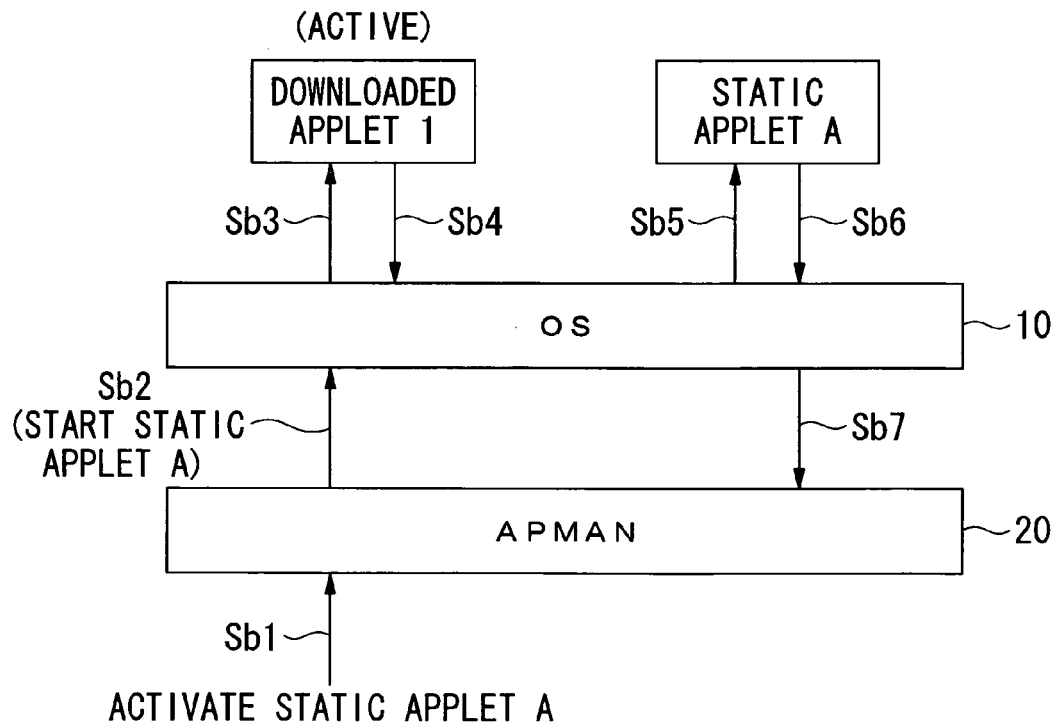
FIG. 6 is a second figure for explanation of the operation of the prior art APMAN.

FIG. 6 is a figure showing the procedure of starting a static applet during an applet which has been downloaded by the APMAN 20 is currently executing.

First, the event reception unit 25 of the APMAN 20 receives the activation event for the static applet A. The event reception unit transmits (in step Sb1) the information about this activation event to the management unit 22. Upon receipt of the information about this activation event, the management unit 22 reads from the starting state storage unit 23 information about the applet which is being executed. Since the applet which is being executed is a downloaded applet which is not being managed by the APMAN 20, the above described decision about the state of conflict is not processed, however, the management unit 22 transmits (in step Sb2) a activation request for the static applet A to the execution unit 12 of the OS 10.

Upon receipt of the activation request for the static applet A, in order to temporarily suspend the downloaded applet 1 which is currently being executed, the execution unit 12 transmits (in step Sb3) a temporary suspension command to the downloaded applet 1. Upon receipt of this temporary suspension command, the downloaded applet 1 goes into the temporarily suspended state, and transmits a temporary suspended response to the execution unit 12. Here, the data for the downloaded applet 1 is not deleted from the execution state storage unit 13 even though it is temporarily suspended, but continues to be in the stored state (in step Sb4). Next, upon receipt of the temporary suspended response, in order to start the static applet A, the execution unit 12 reads the static applet A from the static applet storage unit 40, and stores (in step Sb5) the static applet A in the execution state storage unit 13. After having been activated, the static applet A transmits (in step Sb6) an activation response to the execution unit 12. The execution unit 12 transmits the activation information for the static applet A to the management unit 22. Upon receipt of this activation information for the static applet A, the management unit 22 records (in step Sb7) the information for the static applet A in the starting state storage unit 23.

That is to say, according to the procedure shown in FIG. 6, even if another applet is activated, the downloaded applet continues to be kept in the state in which the data of this downloaded applet is stored in the execution state storage unit 13. Due to this, when the applet which is being activated is terminated, the downloaded applet is caused to transit by the execution unit 12 from the state in which it is temporarily suspended state to the activated state; in this regard, it differs from a static applet. That is to say, if the state transition of the downloaded applet is not interrupted, even if there is a static applet which has been temporarily terminated before the downloaded applet is temporarily suspended, a situation is set up in which it cannot be restarted before the downloaded applet.

Next, the activation control in this embodiment of applets by the APMAN 20 will be explained with reference to FIGS. 7 through 10.

Figure 7:
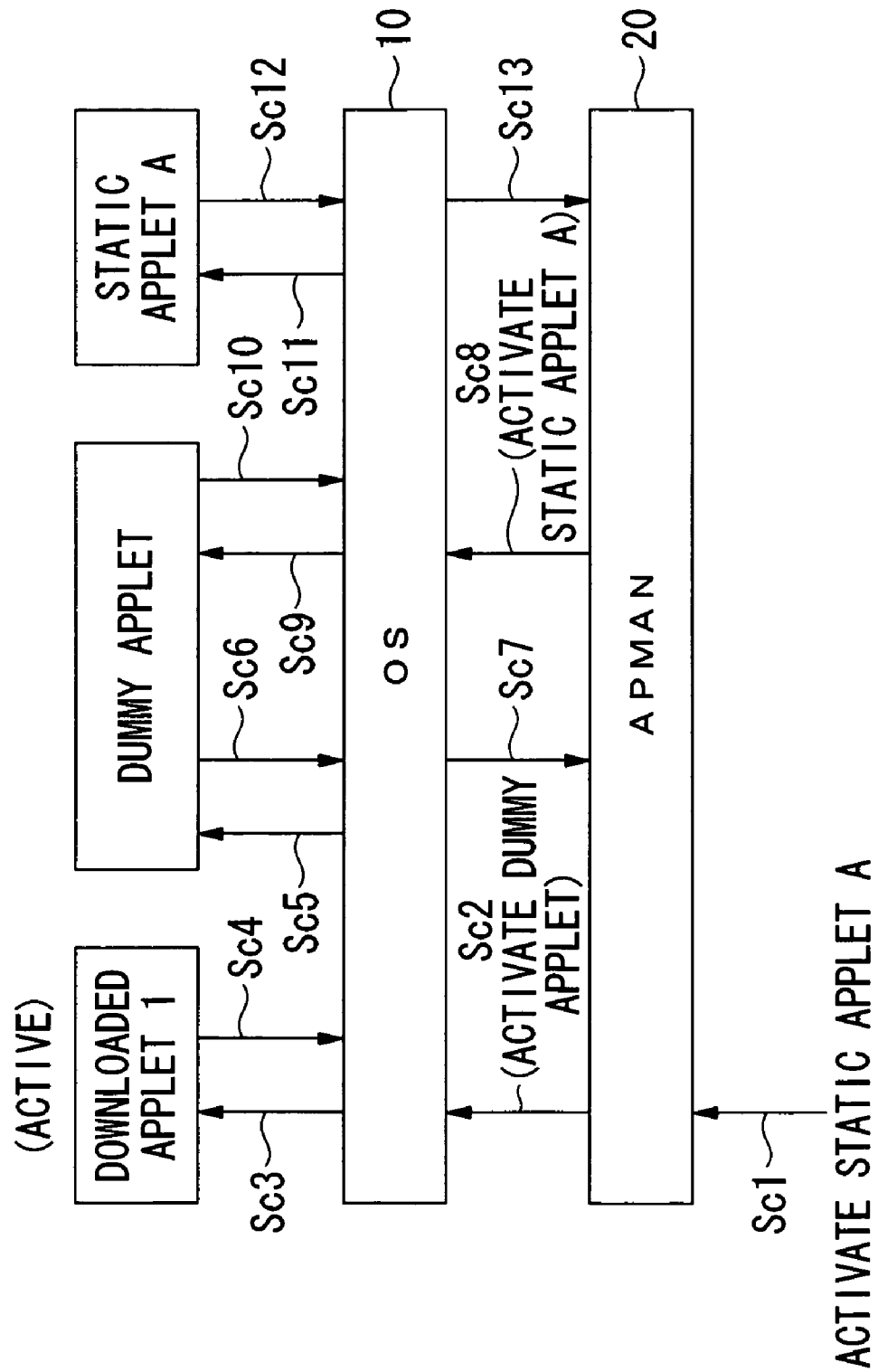
FIG. 7 is a first figure for explanation of the operation of an APMAN of this embodiment.
Figure 10:
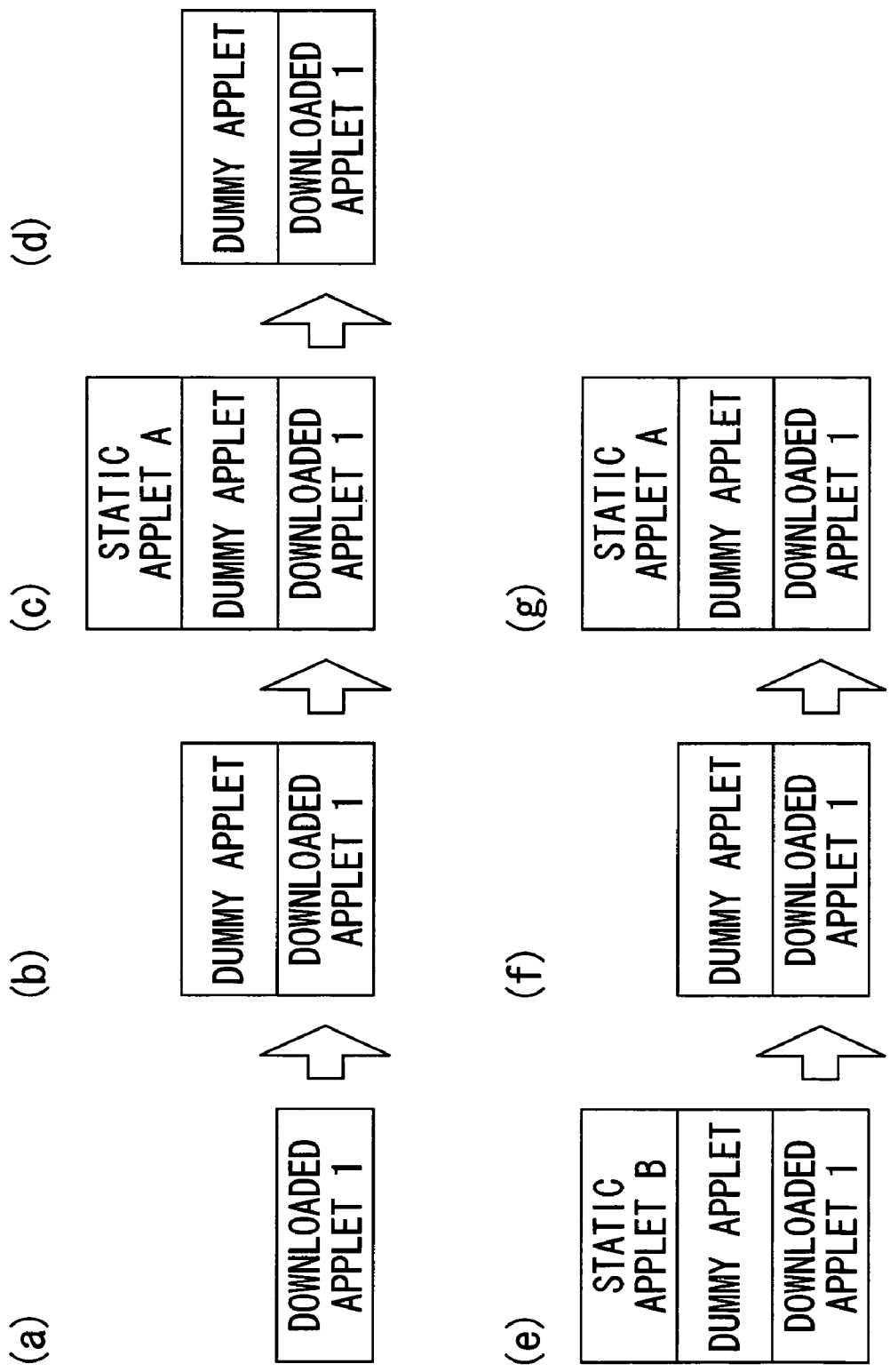
FIG. 10 is a figure showing changes of an execution state storage unit of this embodiment.

The state of the execution state storage unit 13 while a downloaded applet 1 is being executed as shown in FIG. 7, is that only the downloaded applet 1 is stored, as shown in FIG. 10(*a*). In this state, the event reception unit 25 of the APMAN 20 receives (in step Sc1) a activation event for a static applet A. Upon receipt of this event, the management unit 22 reads from the starting state storage unit 23 the information for the applet which is being executed. Since the applet being executed which has thus been read is a downloaded applet which is not managed by the APMAN 20, the management unit 22 transmits (in step Sc2) a dummy applet activation command to the execution unit 12 of the OS 10, in order to activate a dummy applet which corresponds to a substitutional program. Here, a substitutional program is a program which does not particularly perform any output via display or via voice, but is assumed only to cooperate with the APMAN 20.

Upon receipt of this dummy applet activation command, the execution unit 12 transmits (in step Sc3) a temporary suspension command to the downloaded applet 1 which is executing. Upon receipt of this temporary suspension command, the downloaded applet 1 goes into the temporarily suspended state, and transmits a temporary suspended response to the execution unit 12. At this time, even though the downloaded applet 1 has been temporarily suspended, its data is not deleted from the execution state storage unit 13, but maintained to be in the stored state (in step Sc4). Upon receipt of this temporary suspended response, since the dummy applet has been activated, the execution unit 12 stores (in step Sc5) the data of the dummy applet in the execution state storage unit 13. The dummy applet which has been activated transmits (in step Sc6) an activation response to the execution unit 12. At this time, the state of the execution state storage unit 13 becomes that shown in FIG. 10(*b*). Upon receipt of this activation response from the dummy applet, the execution unit 12 transmits the activation information for the dummy applet to the management unit 22. Upon receipt of this activation information for the dummy applet, the management unit 22 stores (in step Sc7) the information for the dummy applet in the starting state storage unit 23.

Next, upon receipt of the activation information from the dummy applet, the management unit 22 transmits (in step Sc8) an activation request for the activation of the static applet A to the execution unit 12. Upon receipt of this activation request, the execution unit 12 transmits (in step Sc9) a temporary suspension command to the dummy applet, in order to put the dummy applet into the temporarily suspended state. Upon receipt of this temporary suspension command, the dummy applet goes into the temporarily suspended state, and transmits a temporary suspended response to the execution unit 12. Here, the data for the dummy applet is not deleted from the execution state storage unit 13 even though it has been temporarily suspended, however, being kept (in step Sc10) in the state of being stored. Upon receipt of this temporary suspended response, in order to activate the static applet A, the execution unit 12 reads the static applet A from the static applet storage unit 40, and stores in a step (Sc11) the static applet A in the execution state storage unit 13. After being activated, an activation response is transmitted to the execution unit 12 (in step Sc12). The execution unit 12 transmits the activation information for this static applet A to the management unit 22. Upon receipt of this activation information for the static applet A, the management unit 22 stores (in step Sc13) the information for this static applet A in the starting state storage unit 23.

At this time, the execution state storage unit 13 is in the state shown in FIG. 10(*c*).

Figure 8:
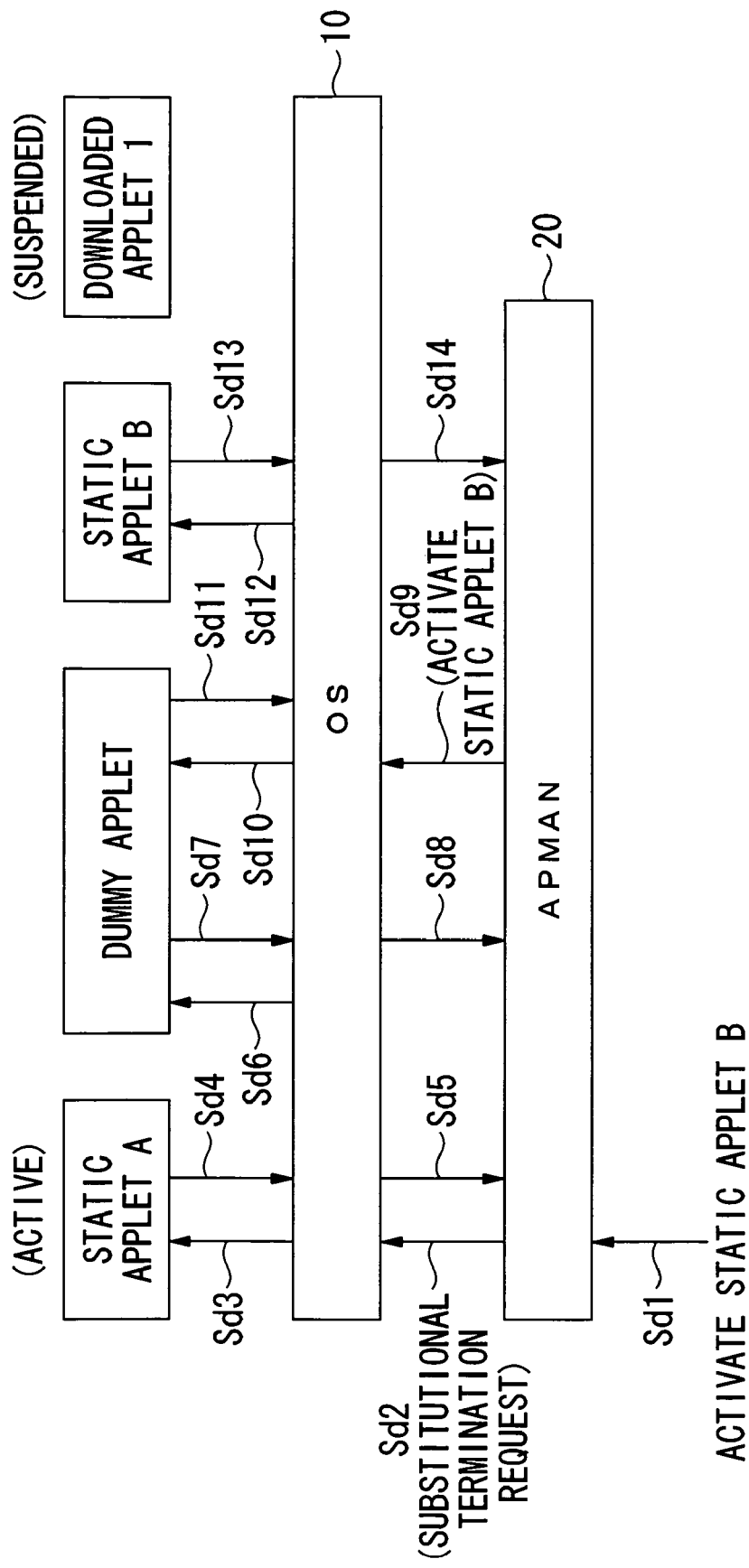
FIG. 8 is a second figure for explanation of the operation of the APMAN of this embodiment.

Following on from FIG. 7, FIG. 8 is a figure showing the procedure when, further, a static applet B is activated. The event reception unit 25 of the APMAN 20 receives the activation event of the static applet B, and transmits that activation event to the management unit 22 (in step Sd1). Upon receipt of the activation event, the management unit 22 reads from the starting state storage unit 23 the information for the applet which is being executed.

Since the applet which has been read and is being executed is a static applet which is managed by the APMAN 20, a decision is made referring to the state of conflict between the static applet A which is being executed and the static applet B for which the start request has been made, and, if there is no conflict between them, then, in order to put the static applet A into the temporarily terminated state, it transmits (in step Sd2) a substitutional termination request to the execution unit 12 of the OS 10.

Upon receipt of this provisional termination request, the execution unit 12 transmits (in step Sd3) to the static applet A a termination command which includes substitutional termination request information, in order, along with terminating that static applet A in the OS 10, also to put it into the suspended state in the APMAN 20. Upon receipt of this termination command which includes the substitutional termination request information, the static applet A transmits to the execution unit 12 a termination response which includes restart information for restart, and it is deleted (in step Sd4) by the execution unit 12 from the execution state storage unit 13. At this time, the state of the execution state storage unit 13 becomes the state shown in FIG. 10(*d*).

Upon receipt of this termination response from the static applet A, the execution unit 12 transmits the restart information for the static applet A to the APMAN 20. Upon receipt of this restart information, the static applet A stores the restart information in the restart information storage unit 24.

Furthermore, the management unit 22 deletes (in step Sd5) the information of the static applet A from the starting state storage unit 23. Furthermore, upon receipt of the termination response from the static applet A, the execution unit 12 stores it in the uppermost layer of the execution state storage unit 13, and transmits (in step Sd6) an activation command for putting the dummy applet, which is in the temporarily suspended state, into the start state. Upon receipt of the activation command, the dummy applet responds (in step Sd7) to the execution unit 12 with an activation response. Upon receipt of the activation response, the execution unit 12 transmits (in step Sd8) the activation information for the dummy applet to the management unit 22.

Upon receipt of the activation information for the dummy applet, the management unit 22 transmits (in step Sd9) an activation request for the activation of the static applet D to the execution unit 12. Upon receipt of this activation request for the static applet B, the execution unit 12 transmits (in step Sd10) a temporary suspension command for putting the dummy applet which is currently executing into the temporarily suspended state. Upon receipt of this temporary suspension command, the dummy applet goes into the temporarily suspended state, and transmits a temporary suspended response to the execution unit 12. At this point, the data of the dummy applet is not deleted from the execution state storage unit 13 even though it is temporarily suspended, but continues (in step Sd11) to be in the state of being stored. Next, upon receipt of this temporary suspended response, the execution unit 12 reads the static applet B from the static applet storage unit 40, in order to activate this static applet B, and store the static applet B in the execution state storage unit 13 (in step Sd12). After activation, the static applet B transmits (in step Sd13) an activation response to the execution unit 12. The execution unit 12 transmits the activation information of the static applet B to the management unit 22. Upon receipt of the activation information of the static applet B, the management unit 22 stores (in step Sd14) the information of the static applet B in the starting state storage unit 23. At this time, the execution state storage unit 13 goes into the state shown in FIG. 10(*e*).

Figure 9:
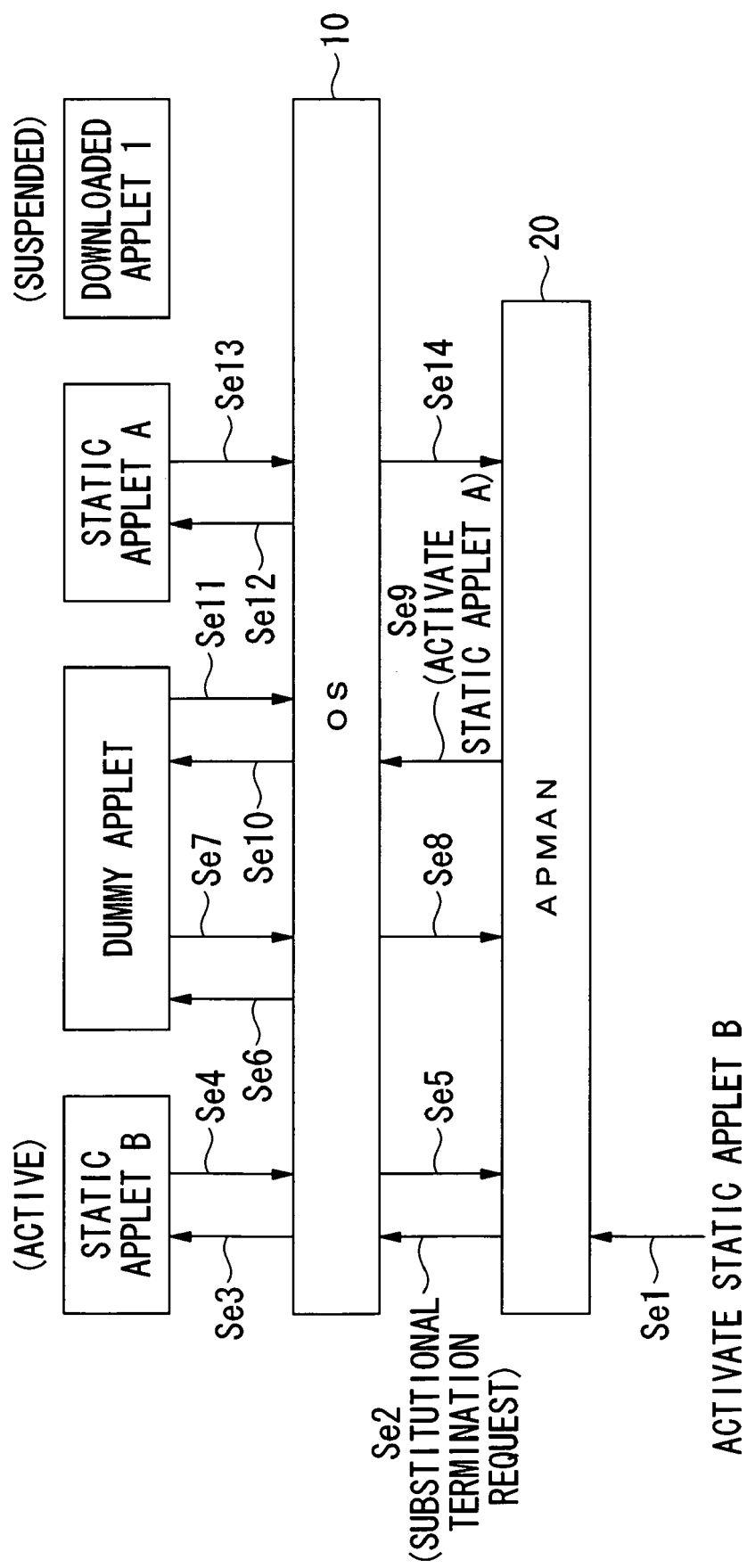
FIG. 9 is a third figure for explanation of the operation of the APMAN of this embodiment.

Following on from FIG. 8, FIG. 9 is a figure showing the processing when terminating the static applet B. The event reception unit 25 of the APMAN 20 receives a termination event which causes the static applet B to be terminated, and transmits (in step Se1) this activation event to the management unit 22. Upon receipt of this activation event, the management unit 22 reads the information of the applet which is being executed from the starting state storage unit 23. Since the applet which has been read and is being executed is a static applet which is being managed by the APMAN 20, a decision is made as to the state of conflict between the static applet B which is being executed and the static applet A for which an activation has been requested, and, if there is no conflict between them, a substitutional termination request is transmitted (in step Se2) to the execution unit 12 of the OS 10, in order to put the static applet B into the temporarily terminated state.

Upon receipt of this termination request for the static applet B, the execution unit 12 transmits (in step Se3) a termination command to the static applet B. The static applet B transmits a termination response to the execution unit 12, and is deleted (in step Se4) by the execution unit 12 from the execution state storage unit 13. At this time, the state of the execution state storage unit 13 becomes the state shown in FIG. 10(*f*).

Upon receipt of this termination response from the static applet B, the execution unit 12 transmits the information that the static applet B has terminated to the management unit 22. Upon receipt of this information that the static applet B has terminated, the management unit 22 deletes (in step Se5) the information of the static applet B from the starting state storage unit 23. Furthermore, upon receipt of the termination response from the static applet B, the execution unit 12 transmits (in step Se6) an activation command for putting into the activated state the dummy applet which is stored in the uppermost layer of the execution state storage unit 13, and which is in the temporarily suspended state. Upon receipt of the activation command, the dummy applet responds (in step Se7) with an activation response to the execution unit 12. Upon receipt of the activation response, the execution unit 12 transmits (in step Se8) the activation information of the dummy applet to the management unit 22.

Upon receipt of this activation information of the dummy applet, the management unit 22 reads the restart information for the static applet A which is stored in the uppermost layer of the restart information storage unit 24. In order to restart the static applet A, the management unit 22 transmits (in step Se9) to the execution unit 12 a start request for the static applet A which includes the restart information for the static applet A. Upon receipt of this start request, the execution unit 12 transmits (in step Se10) a temporary suspension command for putting the dummy applet which is being executed into the temporarily suspended state. Upon receipt of this temporary suspension command, the dummy applet goes in to the temporarily suspended state, and transmits a temporary suspended response to the execution unit 12. At this time, the data of the dummy applet is not deleted from the execution state storage unit 13 even though it is temporarily suspended, but continues (in step Se11) in the state of being stored.

Next, upon receipt of this temporary suspended response, in order to activate the static applet A, the execution unit 12 reads the static applet A from the static applet storage unit 40, and stores (in step Se12) the static applet A in the execution state storage unit 13 in a state including the restart information of this static applet A. After activation, the static applet A transmits (in step Se13) an activation response to the execution unit 12. The execution unit 12 transmits the activation information for this static applet A to the management unit 22. Upon receipt of this activation information for the static applet A, the management unit 22 stores (in step Se14) the information of the static applet A in the starting state storage unit 23. At this time, the execution state storage unit 13 goes into the state shown in FIG. 10(*g*).

According to the procedures shown in the above described FIG. 7 through FIG. 9, when switching applets, it becomes possible to restart the static applet A, so as to prevent the downloaded applet restarting first. Due to this, it becomes possible to restart the applets according to a sequence which can be anticipated by the user.

It should be understood that the data of a dummy applet is a small amount of data of a few kilobytes in volume, so that it may be generated by the management unit 22 or the execution unit 12, and stored in the execution state storage unit 13.

Furthermore in order, when the information for the dummy applets stored in the restart information storage unit 24 is removed, it is designed to terminate the dummy applets, therefore, in order to maintain the order of restart between static applets which have become terminated and downloaded applets, the restart information storage unit 24 needs to be provided with one stack type storage region corresponding to each dummy applet, rather than only one stack type storage region.

Figure 11:
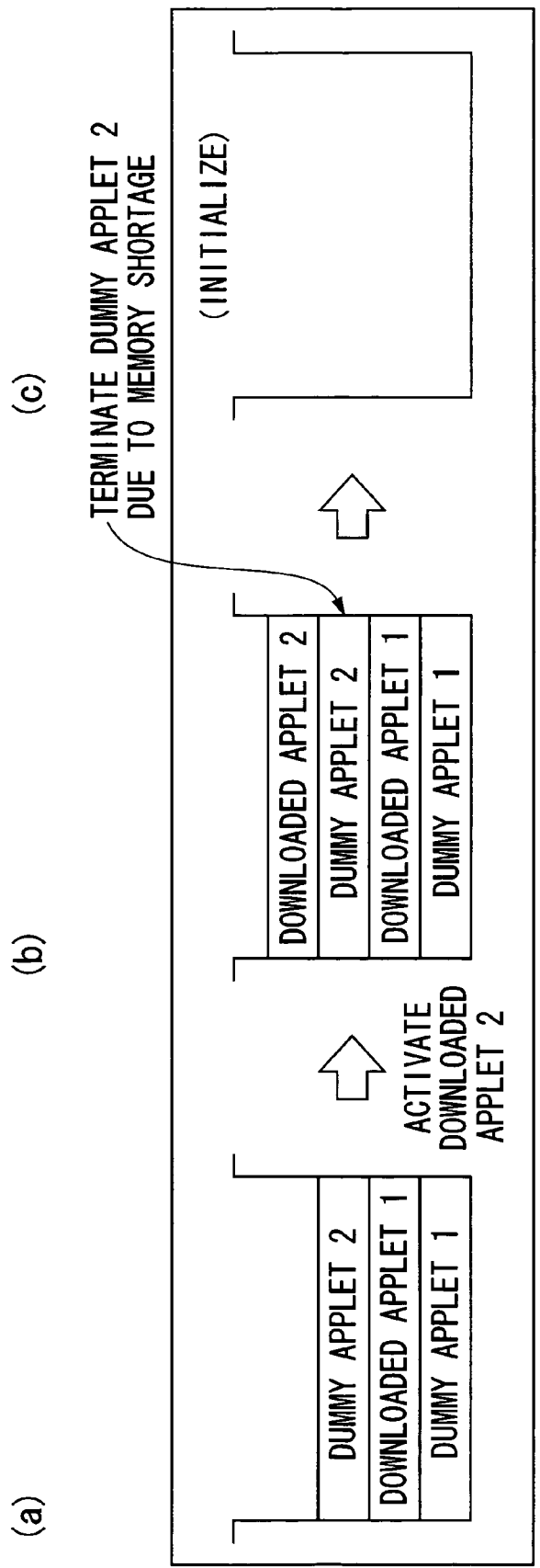
FIG. 11 is a figure showing changes of the execution state storage unit when a dummy applet is forcibly terminated, in this embodiment.

FIG. 11 is a figure for explanation of a deletion procedure performed by the management unit 22 of the APMAN 20 for the data of an applet which is being stored by the execution state storage unit 13.

The execution state storage unit 13 is of a limited capacity, since, as described above, the storage region is allocated within the heap region. Due to this, if the applet data which is stored in the execution state storage unit 13 exceeds capacity, then, in order to execute the applet which has been started at first, the execution unit 12 forcibly deletes the applet data stored in the uppermost layer. FIG. 11(a) through FIG. 11(c) are figures showing this procedure.

In FIG. 11(a), a dummy applet 2 which is being executed is stored in the uppermost layer of the execution state storage unit 13. At this time, when a downloaded applet 2 is to be activated, and the capacity of the execution state storage unit 13 is exceeded, the execution unit 12 deletes the dummy applet 2 from the execution state storage unit 13, and activates the downloaded applet 2. When the dummy applet is thus deleted, restart control of the static applet by the management unit 22 can no longer be issued normally. Due to this, as shown in FIG. 11(c), the management unit 22 deletes all the applet data stored in the execution state storage unit 13, and processes initialization.

As has been explained with reference to FIG. 11, if the dummy applet which is stored in the execution state storage unit 13 has been deleted by the OS 10, it is possible to delete all the data for the applet which is stored in the execution state storage unit 13 and to perform initialization. By doing this, it becomes possible to maintain control of switching the applets by the APMAN 20 in a normal manner.

Next, with reference to FIGS. 12 and 13, start control will be explained in which an idle screen that is activated when the power is on via the key operation unit 52 of the mobile phone terminal 1, and is displayed upon the display section 51 to indicate that communication is being awaited.

As explained first, with reference to FIG. 7 through FIG. 10, since the structure is such that the static applet is restarted by the activation of the dummy applet as an opportunity after reading the restart information which is stored in the restart information storage unit 24, accordingly, for the idle screen applet which is activated when the mobile phone terminal 1 is powered on, when it is put into the temporarily suspended state, an event for restart is lost in a case that there is no dummy applet which corresponds to the idle screen applet. Due to this, if the idle screen applet is temporarily suspended by some other applet being activated, it is necessary to activate a dummy applet, in order to make it possible to perform restart.

Figure 12:
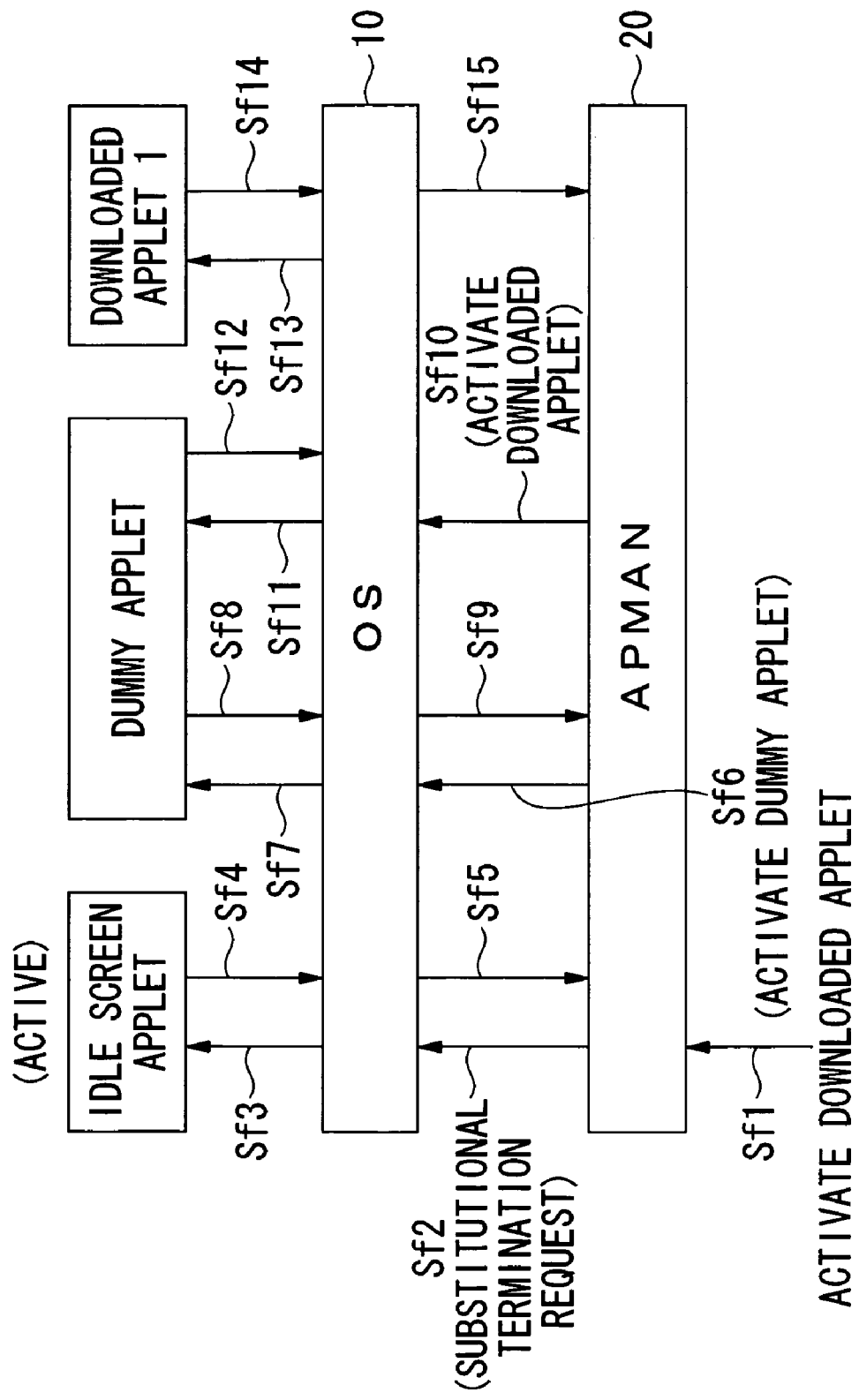
FIG. 12 is a figure for explanation of the operation of the APMAN when an idle screen applet is temporarily terminated, in this embodiment.

FIG. 12 is a figure showing the processing when the idle screen applet is put into the temporarily suspended state.

In this figure, the idle screen applet is being activated, and the state of the execution state storage unit 13 is that only the idle screen applet is stored, as shown in FIG. 13(a). In this state, the event reception unit 25 of the APMAN 20 receives the activation event for a downloaded applet 1. Upon receipt of the activation event for the downloaded applet 1, the event reception unit 25 transmits (in step Sf1) the activation event to the management unit 22. Upon receipt of this activation event, the management unit 22 reads the information for the applet which is being activated from the starting state storage unit 23. Since the applet which has thus been read and is being activated is the idle screen applet which is managed by the APMAN 20, a substitutional termination request is transmitted (in step Sf2) to the execution unit 12 of the OS 10, in order to put the idle screen applet into the temporarily suspended state.

Upon receipt of this substitutional termination request, the execution unit 12 transmits (in step Sf3) to the idle screen applet a termination command including substitutional termination request information, in order, along with terminating the idle screen applet in the OS 10, to set the suspended state in the APMAN 20. The idle screen applet receives the termination command including the substitutional termination request information, transmits to the execution unit 12 a termination response which includes restart information for restart, and is deleted (in step Sf4) from the execution state storage unit 13 by the execution unit 12.

Upon receipt of this termination response, the execution unit 12 transmits the restart information for the idle screen applet to the management unit 22. Upon receipt of the restart information, the restart information is stored in the restart information storage unit 24. Furthermore, the information of the idle screen applet is deleted (in step Sf5) from the starting state storage unit 23. Next, upon receipt of the termination response of the idle screen applet, the management unit 22 transmits (in step Sf6) to the execution unit 12 a dummy applet activation command, in order to activate a dummy applet. Upon receipt of the dummy applet activation command, the execution unit 12 stores (in step Sf7) the data of the dummy applet in the execution state storage unit 13, in order to activate the dummy applet.

The dummy applet which has been activated transmits (in step Sf8) its start response to the execution unit 12. At this time, the state of the execution state storage unit 13 comes to be as shown in FIG. 13(b). Upon receipt of the start response from the dummy applet, the execution unit 12 transmits the activation information of the dummy applet to the management unit 22. Upon receipt of this activation information of the dummy applet, the management unit 22 stores (in step Sf9) the information of the dummy applet in the starting state storage unit 23. Next, upon receipt of the activation information for the dummy applet, the management unit 22 transmits (in step Sf10) an activation request to the execution unit 12 for the activation of the downloaded applet 1. Upon receipt of the activation request, the execution unit 12 transmits (in step Sf11) a temporary suspension command to the dummy applet, in order to put into the temporarily suspended state.

Upon receipt of this temporary suspension command, the dummy applet goes into the temporarily suspended state, and transmits a temporary suspended response to the execution unit 12. At this time, the data for the dummy applet is not deleted from the execution state storage unit 13, but continues (in step Sf12) in the state of being stored. Next, upon receipt of the temporary suspended response, in order to activate the downloaded applet 1, the execution unit 12 reads the downloaded applet 1 from the download storage unit 30, and stores (in step Sf13) the downloaded applet 1 in the execution state storage unit 13. The downloaded applet which has been activated transmits (in step Sf14) an activation response to the execution unit 12. Upon receipt of the activation response of the downloaded applet 1, the execution unit 12 transmits the activation information of the downloaded applet 1 to the management unit 22. Upon receipt of the activation information of the downloaded applet 1, the management unit 22 stores (in step Sf15) the information of the downloaded applet 1 in the starting state storage unit 23. At this time, the execution state storage unit 13 comes to be in the state shown in FIG. 13(c).

As explained with reference to FIG. 12 and FIG. 13, even in the case of an idle screen applet, it becomes possible to restart the idle screen applet by activating a dummy applet when substitutionaly terminating the idle screen applet.

A computer system is provided internally by the above described mobile phone terminal. During the processing performed by the above described mobile phone terminal, the above described procedures are stored in a form of a program upon a storage medium which can be read by a computer, and it can be executed by reading the program with the computer. Here, a storage medium which can be read by a computer, is a magnetic disk, a magneto-optical disk, a CD-ROM, a DVD-ROM, a semiconductor memory or the like. Moreover, it may be arranged for this computer program to be distributed to the computer via a communication line, and for the computer, upon receipt of this distribution, to execute this program.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mobile phone terminal which executes a managed program and an unmanaged program, comprising:
    a program execution unit which performs any of procedures of activation, suspension, and termination of the managed program and the unmanaged program which are stored in an execution state storage unit; and
    a program management unit which,
    when execution of the managed program is requested when the unmanaged program is active, issues a request to the program execution unit for execution of a substitutional program which is a dummy program and corresponds to the unmanaged program, wherein
    the program execution unit, based on the request of executing the substitutional program from the program management unit, controls the unmanaged program to be in a suspended state, starts execution of the substitutional program, and notifies the program management unit of the start of the substitutional program,
    the program management unit, when receiving the notification of the start of the substitutional program from the program execution unit, issues a request to the program execution unit for a start of the managed program, and
    the program execution unit, based on the request of the start of the managed program, controls the substitutional program to be in a suspended state and start execution of the managed program.

2. The mobile phone terminal according to claim 1, further comprising:
    a restate information storage unit which, in a situation in which activation of another program is requested while the managed program in the execution state storage unit is being activated, when the managed program is terminated and the another program is activated, along with terminating the managed program, stores restart information for subsequently restarting the managed program, and wherein
    the program management unit, when putting into activated state the substitutional program which has been in suspended state, refers to the restart information storage unit and, when the restart information is stored, restarts the managed program in the program execution unit corresponding to the restart information.

3. The mobile phone terminal according to claim 2, wherein the program management unit, when it has referred to the restart information storage unit due to activation of the substitutional program which has been in suspended state, when a corresponding restart information is not stored, then terminates the substitutional program in the program execution unit.

4. The mobile phone terminal according to claim 1, wherein the managed program is a program which is originally installed and managed by the program management unit, and the unmanaged program is a program which is additionally installed by an operation of a user.

5. The mobile phone terminal according to claim 1, wherein the program management unit, when the substitutional program is forcibly terminated by the program execution unit, requests the program execution unit to delete the substitutional program which is stored in the execution state storage unit.

6. The mobile phone terminal according to claim 2, wherein
    the mobile phone terminal further activates an idle screen program which displays an idle screen in a state in which communication is being awaited, and
    the program management unit, when activating the another program in a state in which the idle screen program is stored in the execution state storage unit as a program which is being activated, along with storing in the restart information storage unit the restart information for restarting the idle screen program which is being activated, also starts the another program in the program execution unit after terminating the idle screen program.

7. A program management method which is applied to a mobile phone terminal which includes:
    an execution state storage unit; and
    a program execution unit which performs one of procedures of execution, suspension, and termination of programs by storing a managed program and an unmanaged program in the execution state storage unit;
    the program management method comprising:
    a step of, when execution of the managed program is requested when the unmanaged program is active, controlling the unmanaged program to be in a suspended state and generating a substitutional program which is a dummy program and corresponds to the unmanaged program;
    a step of controlling the generated substitutional program to be in a suspended state and storing the generated substitutional program in the execution state storage unit; and
    a step of, after controlling the generated substitutional program to be in a suspended state, starting execution of the managed program in the program execution unit.

8. The program management method according to claim 7, further comprising:
    a step of, in a situation in which activation of another program is requested while the managed program in the execution state storage unit is being activated, when the managed program is terminated and the another program is activated, along with terminating the managed program, storing restart information for subsequently restarting the managed program;
    a step of, when putting into activated state the substitutional program which has been in suspended state, judging whether or not the restart information is stored, and restarting the managed program in the program execution unit corresponding to the restart information when the restart information is stored.

9. The program management method according to claim 8, further comprising:

a step of, when the substitutional program which has been in suspended state is activated, judging whether or not the restart information is stored, terminating the substitutional program in the program execution unit when the corresponding restart information is not stored.

10. The program management method according to claim 7, wherein the managed program is a program which is originally installed and managed, and the unmanaged program is a program which is additionally installed by an operation of a user.

11. The program management method according to claim 7, further comprising:
a step of, when the substitutional program is forcibly terminated by the program execution unit, requesting the program execution unit to delete the substitutional program which is stored in the execution state storage unit.

12. The program management method according to claim 7, wherein the mobile phone terminal further activates an idle screen program which displays an idle screen in a state in which communication is being awaited, and further comprising:
a step of, when activating another program in a state in which the idle screen program is stored in the execution state storage unit as a program which is being activated, along with storing the restart information for restarting the idle screen program which is being activated, also starting the another program in the program execution unit after terminating the idle screen program.

13. A non-transitory computer readable program product in a computer readable medium of a computer included in a mobile phone terminal which has:
an execution state storage unit;
and a program execution unit which performs one of procedures of execution, suspension, and termination of programs by storing a managed program and an unmanaged program in the execution state storage unit, the non-transitory computer readable program product comprising:
first instructions for, when execution of the managed program is requested when the unmanaged program is active, controlling the unmanaged program to be in a suspended state and generating a substitutional program which is a dummy program and corresponds to the unmanaged program;
second instructions for controlling the generated substitutional program to be in a suspended state and storing the generated substitutional program in the execution state storage unit; and
third instructions for, after controlling the generated substitutional program to be in a suspended state, starting execution of the managed program in the program execution unit.

14. The non-transitory computer readable program product according to claim 13, further comprising:
fourth instructions for, in a situation in which activation of another program is requested while the managed program in the execution state storage unit is being activated, when the managed program is terminated and the another program is activated, along with terminating the managed program, storing restart information for subsequently restarting the managed program;
fifth instructions for, when putting into activated state the substitutional program which has been in suspended state, judging whether or not the restart information is stored, and restarting the managed program in the program execution unit corresponding to the restart information when the restart information is stored.

15. The non-transitory computer readable program product according to claim 14, further comprising:
sixth instructions for, when the substitutional program which has been in suspended state is activated, judging whether or not the restart information is stored, terminating the substitutional program in the program execution unit when the corresponding restart information is not stored.

16. The non-transitory computer readable program product according to claim 13, wherein the managed program is a program which is originally installed and managed, and the unmanaged program is a program which is additionally installed by an operation of a user.

17. The non-transitory computer readable program product according to claim 13, further comprising:
seventh instructions for, when the substitutional program is forcibly terminated by the program execution unit, requesting the program execution unit to delete the substitutional program which is stored in the execution state storage unit.

18. The non-transitory computer readable program product according to claim 13, wherein
the mobile phone terminal further activates an idle screen program which displays an idle screen in a state in which communication is being awaited, further comprising:
eighth instructions for, when activating another program in a state in which the idle screen program is stored in the execution state storage unit as a program which is being activated, along with storing restart information for restarting the idle screen program which is being activated, also starting the another program in the program execution unit after terminating the idle screen program.

* * * * *